United States Patent
Fernandez

(10) Patent No.: US 10,730,970 B2
(45) Date of Patent: Aug. 4, 2020

(54) PROCESS FOR DETERMINING ONE OR MORE OPERATING CONDITIONS OF AN OLEFIN POLYMERIZATION REACTOR

(71) Applicant: TOTAL RESEARCH & TECHNOLOGY FELUY, Seneffe (BE)

(72) Inventor: Alvaro Fernandez, Nivelles (BE)

(73) Assignee: TOTAL RESEARCH & TECHNOLOGY FELUY, Sneffe (BE)

( * ) Notice: Subject to any disclaimer, the term of this patent is extended or adjusted under 35 U.S.C. 154(b) by 220 days.

(21) Appl. No.: 16/062,737

(22) PCT Filed: Dec. 15, 2016

(86) PCT No.: PCT/EP2016/081213
§ 371 (c)(1),
(2) Date: Jun. 15, 2018

(87) PCT Pub. No.: WO2017/102958
PCT Pub. Date: Jun. 22, 2017

(65) Prior Publication Data
US 2020/0140579 A1    May 7, 2020

(30) Foreign Application Priority Data

Dec. 17, 2015 (EP) .................................. 15200939

(51) Int. Cl.
*C08F 10/02* (2006.01)
*C08F 2/14* (2006.01)
(Continued)

(52) U.S. Cl.
CPC .......... *C08F 10/02* (2013.01); *B01J 19/0013* (2013.01); *B01J 19/0066* (2013.01); *B01J 19/06* (2013.01);
(Continued)

(58) Field of Classification Search
USPC ....................... 526/60, 61; 700/269; 422/105
See application file for complete search history.

(56) References Cited

U.S. PATENT DOCUMENTS 6,864,207 B2    3/2005    Knoeppel et al.
6,930,071 B2    8/2005    Knoeppel et al.
(Continued)

FOREIGN PATENT DOCUMENTS

EP    0432555 A2    6/1991
EP    0994908 B1    8/2003
(Continued)

OTHER PUBLICATIONS

International Search Report issued in PCT/EP2016/081213, dated Mar. 16, 2017, 4 pages.

*Primary Examiner* — Fred M Teskin
(74) *Attorney, Agent, or Firm* — Albert Shung

(57) ABSTRACT

The present invention relates to a process for determining a set of one or more operating conditions of an olefin polymerization reactor for the synthesis of a polyolefin in slurry condition, comprising the steps of:
a1) introducing a polyolefin into a volume of at least one diluent, said diluent being agitated by a powered agitator at a first temperature T1;
b1) monitoring the power consumed by the agitator as a function of the concentration, for at least three concentrations C1, C2, and Cn, which are different from each other;
c1) repeating steps a1) and b1) at two or more subsequent temperatures T2 and Tn, which are different from each other and from T1;
d1) determining from the power consumed by the agitator as a function of concentration, said set of one or more stable operating conditions for the synthesis of the polyolefin in the olefin polymerization reactor.

14 Claims, 3 Drawing Sheets

(51) Int. Cl.
*B01J 19/06* (2006.01)
*B01J 19/00* (2006.01)
*B01J 19/18* (2006.01)

(52) U.S. Cl.
CPC .. *B01J 19/1868* (2013.01); *B01J 2219/00051* (2013.01); *B01J 2219/00202* (2013.01); *C08F 2400/02* (2013.01)

(56) References Cited

U.S. PATENT DOCUMENTS

| | | | |
|---|---|---|---|
| 8,106,136 B2 * | 1/2012 | Siraux | C08F 10/02 526/61 |
| 8,706,304 B2 * | 4/2014 | Lewalle | C08F 10/02 700/269 |
| 2013/0211018 A1 | 8/2013 | Willocq et al. | |
| 2015/0209751 A1 | 7/2015 | Hari et al. | |

FOREIGN PATENT DOCUMENTS

| | | |
|---|---|---|
| EP | 1563903 A1 | 8/2005 |
| WO | 2004026463 A1 | 4/2004 |
| WO | 2006003144 A1 | 1/2006 |
| WO | 2012013806 A1 | 2/2012 |

\* cited by examiner

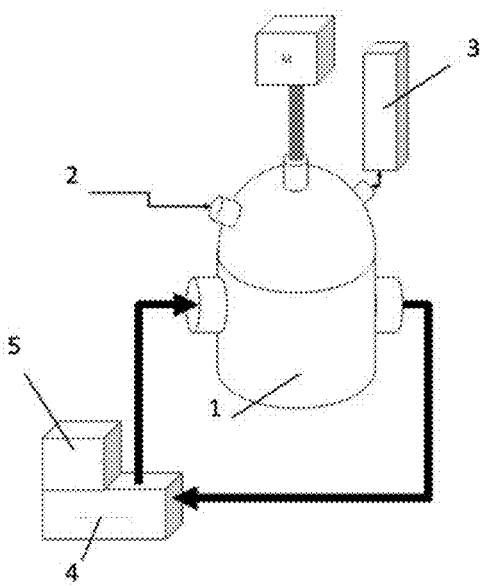
Fig. 1A     Fig. 1B
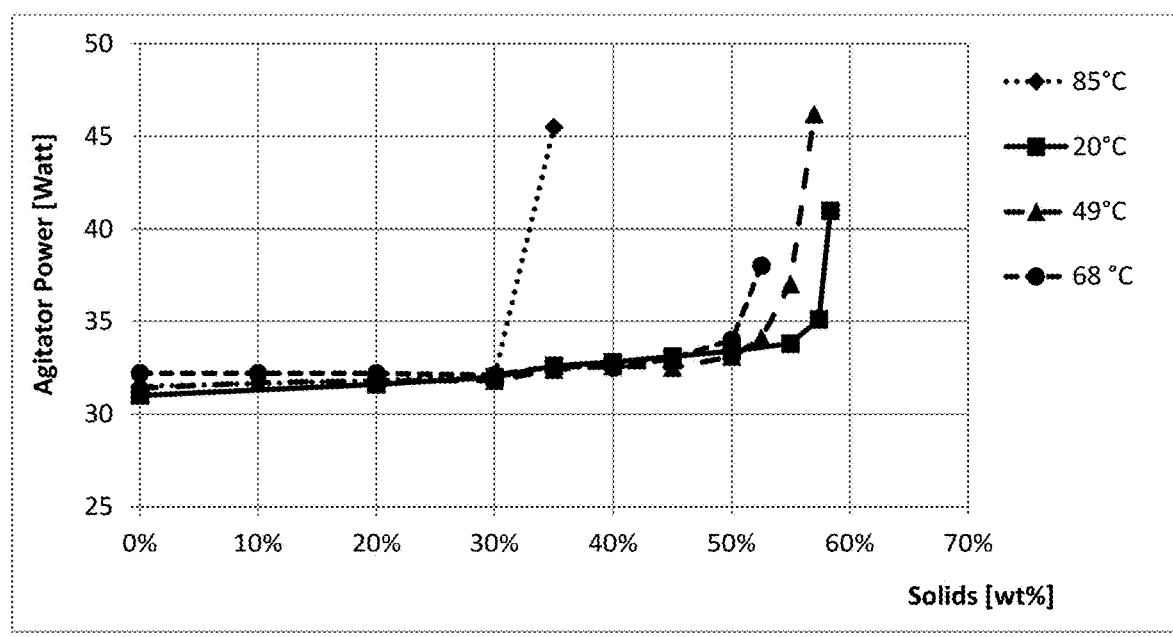
Fig. 2

PROCESS FOR DETERMINING ONE OR MORE OPERATING CONDITIONS OF AN OLEFIN POLYMERIZATION REACTOR

CROSS-REFERENCE TO RELATED APPLICATIONS

This application claims the benefit of PCT/EP2016/081213 filed Dec. 15, 2016, which claims priority from EP 15200939.5 filed Dec. 17, 2015, which are incorporated herein by reference in their entireties for all purposes.

TECHNICAL FIELD

The present invention relates to a process for determining one or more operating conditions of an olefin polymerization reactor for the synthesis of a polyolefin.

BACKGROUND

Polyolefins, such as polyethylene (PE), are synthesized by polymerizing monomers, such as ethylene ($CH_2$=$CH_2$). Because polyolefins are cheap, safe and stable to most environments and can be easily processed, polyolefin polymers are useful in many applications. For example PE can be classified into several types according to its properties, such as (but not limited to) LDPE (Low Density Polyethylene), LLDPE (Linear Low Density Polyethylene), and HDPE (High Density Polyethylene). Each type of polyethylene has different properties and characteristics.

Polyolefins can be produced from monomers in the presence of diluent and catalyst and optionally one or more co-monomers and molecular weight regulators in a loop reactor. For example, polyethylene can be produced from ethylene monomer in the presence of diluent and catalyst and optionally one or more co-monomers and molecular weight regulators in a loop reactor. Usually the loop reactor is a liquid phase loop reactor wherein the components are circulated under pressure in slurry conditions. The product usually consists of solid particles and is in suspension in a diluent. The liquid diluent can be any hydrocarbon that is inert and liquid during ethylene polymerization, for example alkanes, such as isobutane. The catalyst for producing polyethylene may typically comprise a chromium-based catalyst, a Ziegler-Natta catalyst or a metallocene catalyst. The molecular weight regulator, if added, is usually hydrogen. A co-monomer can be any alpha-olefin with at least three carbons.

Continuous circulation of the slurry contents of the reactor is typically maintained with a pump, which also ensures efficient suspension of the polymer solid particles in the liquid diluent. Circulation is carried out at elevated polymerization temperatures around the loop reactor, thereby producing polyethylene. The product can be discharged by means of settling legs for example, which operate on a batch principle or continuously to recover the product. Settling in the legs is used to increase the concentration of solids in the slurry to be recovered as product slurry. The product can further be discharged to a flash tank, through flash lines, where most of the diluent and unreacted monomers are flashed off and recycled. The polymer particles are dried, optionally additives can be added and finally the polymer is extruded and pelletized. Alternatively, after discharging the product slurry from the settling legs, the reaction mixture may be fed to a second loop reactor serially connected to the first loop reactor where a second polyethylene fraction may be produced. Typically, when two reactors in series are employed in this manner, i.e. a first polyethylene fraction is produced in a first reactor and a second polyethylene fraction is produced in a second reactor, the resultant polyethylene product has a broad or bimodal molecular weight distribution.

Ethylene co-polymerization is the process wherein ethylene is polymerized with co-monomer, i.e. an alpha-olefin, such as e.g. propylene, butene, 1-hexene, etc. The lower the desired density of the final polyethylene, the higher the concentration of co-monomer in the reactor must be. A major problem in such co-polymerization processes is that the control of reaction parameters is very difficult. In particular, the ratio of co-monomer to ethylene monomer can differ at different points in the reactor. It also becomes more difficult to control and optimize reaction conditions, such as reaction temperature and solid concentration in reaction slurry, when producing polyethylene, for example when producing linear low-density polyethylene.

The operating temperature in the reactor is preferably set as high as possible in order to have optimum conditions, i.e. the higher the temperature in the reactor, the higher the productivity of the catalyst. However, increasing the temperature also increases the risk of swelling which may occur in the reactor. Swelling is the phenomenon where diluent enters the amorphous phase of the polymer (that can be partially dissolved in the diluent) and makes the polymer matrix increase in volume (swell). Co-monomer, e.g. 1-hexene, if present, is an even better solvent for low molecular weight polymers, and the polymer produced having a lower density is more prone to swelling (increased ratio of amorphous to crystalline polymer ratio). Hence co-polymerization processes suffer from a higher risk of swelling than homo-polymerization processes. Since some polymer is dissolved in the diluent, the polymer slurry becomes more viscous. Moreover, since swelling leads to an increased volume fraction of solids in the reactor (for the same weight of solids content), it might lead to particles touching each other, therefore increasing the slurry viscosity dramatically, which can perturb the reactor flow, leading to hydrodynamic instabilities and may even lead to blockage of the reactor. Therefore, at least temperature and solid concentration of the slurry must be properly controlled.

In the past, the risk of swelling was decreased by setting the polymerization temperature well below the temperature at which swelling is believed to pose a problem. Classically, this temperature has been predicted for chromium-catalyzed polymerizations by calculating it from the linear relationship between the reaction temperature and the resin density, i.e. the swelling curve. The problem with using traditional swelling curves is that they do not allow the full potential of the catalyst to be exploited. Actual operating temperatures are usually far below the optimum temperatures, which could theoretically still be utilized without the risk of swelling. As a result of the low reactor temperatures, the catalyst has limited productivity, the polymer has difficulties settling in the settling legs and co-monomer is not incorporated efficiently. Furthermore, operating at lower temperatures may impose limitations on the process, as a result of limitations imposed by a cooling system.

EP 1 563 903 describes a means to react to a hydrodynamic instability, it does not provide the means to determine the safe operating region.

EP 0 432 555 A2 establishes control signals which typify flow rate of diluent fluid required to (a) maintain a minimum velocity for the circulating reaction slurry, (b) maintain a maximum pressure head at a selected point in the reactor and (c) maintain a maximum power level supplied to the circulation pump.

US 2015/0209751 discloses a method including measuring parameters for the polymerization reactor including a reactor temperature and a concentration of an induced condensing agent in a polymerization reactor. Induced condensing agents are used in gas phase polymerization to increase cooling capabilities at a given reactor temperature. The use of condensing agents modifies the temperature at which the polymer softens.

SUMMARY OF THE INVENTION

In view of the above, there is a need in the art to provide a process for improving the polymerization reaction of olefins, where issues such as hydrodynamic instabilities and fouling in slurry reactors are avoided and/or reverted. There is a need in the art to provide a process that determines the safe operating region in order to avoid the onset of hydrodynamic instabilities, and that provides a means to maximize process performance. There is a need in the art to provide a process that is more complete and will provide for the optimum between stability and process performance. It is therefore an aim of the invention to optimize the polyolefin slurry polymerization process. It is the finding of the present invention that the above aim can be achieved by processes as presently claimed and preferred embodiments thereof.

According to a first aspect, the invention provides a process for determining a set of one or more operating conditions of an olefin polymerization reactor for the synthesis of a polyolefin in slurry condition, comprising the steps of:
  a1) introducing a polyolefin into a volume of at least one diluent, said diluent being agitated by a powered agitator at a first temperature T1;
  b1) monitoring the power consumed by the agitator as a function of the polyolefin concentration, for at least three concentrations C1, C2, and Cn, which are different from each other;
  c1) repeating steps a1) and b1) at two or more subsequent temperatures T2 and Tn, which are different from each other and from T1;
  d1) determining from the power consumed by the agitator as a function of concentration, said set of one or more operating conditions for the synthesis of the polyolefin in the olefin polymerization reactor.

The invention considers the reactor problem as a multi-dimensional problem with a higher level of complexity than the prior art, because temperature is coupled to solid content in the reactor. The inventors have found that analyzing temperature on its own is incomplete, especially for slurry loop reactors.

According to a second aspect, the invention provides a process for determining a set of one or more operating conditions of an olefin polymerization reactor for the synthesis of a polyolefin in slurry condition, comprising the steps of:
  a2) introducing a polyolefin into a volume of at least one diluent, said diluent being agitated by a powered agitator, at a first polyolefin concentration C1;
  b2) monitoring the power consumed by the agitator as a function of the temperature, for at least three temperatures T1, T2, and Tn, which are different from each other;
  c2) repeating steps a2) and b2) at two or more subsequent polyolefin concentrations C2 and Cn, which are different from each other and from C1;
  d2) determining from the power consumed by the agitator as a function of temperature, said set of one or more operating conditions for the synthesis of the polyolefin in the olefin polymerization reactor.

According to a third aspect, the invention provides a process for operating an olefin polymerization reactor in slurry condition, comprising the steps of:
  i) receiving a set of one or more operating conditions of an olefin polymerization reactor previously obtained according to the process according to the first or second aspect of the invention; and
  ii) operating said olefin polymerization reactor at operating conditions within the set of one or more operating conditions obtained in step i).

The independent and dependent claims set out particular and preferred features of the invention. Features from the dependent claims may be combined with features of the independent or other dependent claims as appropriate.

The present invention will now be further described. In the following passages, different aspects of the invention are defined in more detail.

BRIEF DESCRIPTION OF THE DRAWINGS

FIGS. 1A and 1B represent a container (1) suitable for performing some embodiments of the processes according to the invention, for example when the diluent is n-heptane.

FIG. 2 represents a graph plotting the power consumption of the agitator as a function of the concentration for 4 different temperatures.

DETAILED DESCRIPTION OF THE INVENTION

Figure 3A:
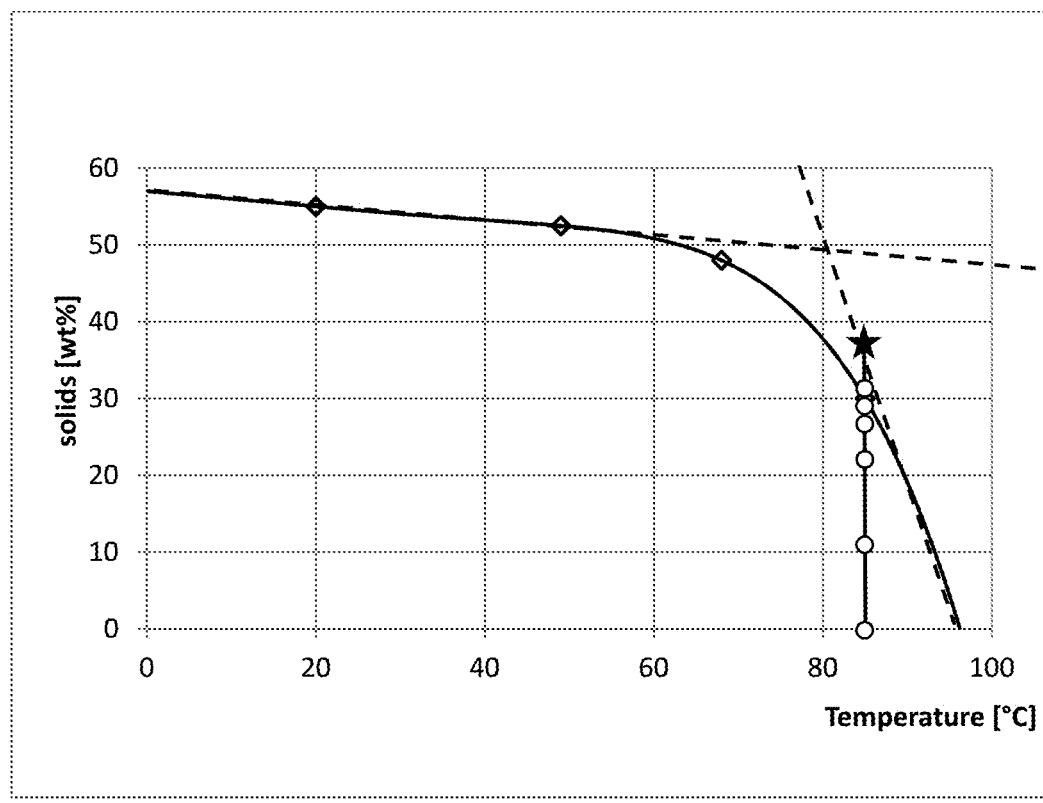
FIG. 3A represents a graph plotting the maximum stable concentration as a function of the temperature.

Before the present processes according to the present invention are described, it is to be understood that this invention is not limited to particular processes described, since such processes may, of course, vary. It is also to be understood that the terminology used herein is not intended to be limiting, since the scope of the present invention will be limited only by the appended claims.

When describing the invention, the terms used are to be construed in accordance with the following definitions, unless the context dictates otherwise.

As used herein, the singular forms "a", "an", and "the" include both singular and plural referents unless the context clearly dictates otherwise. By way of example, "a resin" means one resin or more than one resin. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination. The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of". The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Preferred statements (features) and embodiments of the processes and uses of this invention are set herein below. Each statements and embodiments of the invention so defined may be combined with any other statement and/or embodiments unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 49, with any other statement and/or embodiments.

1. A process for determining a set of one or more operating conditions of an olefin polymerization reactor for the synthesis of a polyolefin in slurry condition, comprising the steps of:
    a1) introducing a polyolefin into a volume of at least one diluent, said diluent being agitated by a powered agitator at a first temperature T1;
    b1) monitoring the power consumed by the agitator as a function of the concentration, for at least three polyolefin concentrations C1, C2, and Cn, which are different from each other;
    c1) repeating steps a1) and b1) at two or more subsequent temperatures T2 and Tn, which are different from each other and from T1;
    d1) determining from the power consumed by the agitator as a function of concentration, said set of one or more operating conditions for the synthesis of the polyolefin in the olefin polymerization reactor.
2. A process for determining a set of one or more operating conditions of an olefin polymerization reactor for the synthesis of a polyolefin in slurry condition, comprising the steps of:
    a2) introducing a polyolefin into a volume of at least one diluent, said diluent being agitated by a powered agitator, at a first polyolefin concentration C1;
    b2) monitoring the power consumed by the agitator as a function of the temperature, for at least three temperatures T1, T2, and Tn, which are different from each other;
    c2) repeating steps a2) and b2) at two or more subsequent polyolefin concentrations C2 and Cn, which are different from each other and from C1;
    d2) determining from the power consumed by the agitator as a function of temperature, said set of one or more operating conditions for the synthesis of the polyolefin in the olefin polymerization reactor.
3. The process according to any one of statements 1 or 2, wherein said set of one or more operating conditions comprises one or more combinations of concentration and temperature.
4. The process according to any one of statements 1 to 3, wherein the polyolefin is polyethylene.
5. The process according to any one of statements 1 to 4, wherein the polyolefin is a metallocene-catalyzed polyolefin.
6. The process according to any one of statements 1 to 5, wherein the polyolefin is metallocene-catalyzed polyethylene.
7. The process according to any one of statements 1 to 6, wherein said set of one or more operating conditions comprises one or more combinations of concentration and temperature and wherein the polyolefin is polyethylene, preferably metallocene-catalyzed polyethylene.
8. The process according to any one of statements 1 to 7, wherein step a1) comprises gradually introducing a polyolefin into a volume of at least one diluent, said diluent being agitated by a powered agitator at a first temperature T1.
9. The process according to any one of statements 1 to 8, wherein step a2) comprises introducing a polyolefin into a volume of at least one diluent, said diluent being agitated by a powered agitator, at a first concentration C1, and gradually changing the temperature.
10. The process according to any one of statements 1 to 9, wherein step a1) or a2) is performed in a container (1), also referred to as vessel (1), which is not the main olefin polymerization reactor.
11. The process according to any one of statements 1 to 10, wherein step a1) or a2) is performed in a continuously agitated container (1) or in a loop reactor.
12. The process according to any one of statements 1 to 11, wherein the temperature of the container (1) is thermostatically controlled.
13. The process according to any one of statements 1 to 12, wherein step a1) comprises gradually introducing a polyolefin into a volume of at least one diluent, said diluent being agitated by a powered agitator at a first temperature T1, and wherein step a1) is performed in a container (1) which is not the main olefin polymerization reactor, preferably wherein step a1) is performed in a continuously agitated container (1).
14. The process according to any one of statements 1 to 13, wherein step a2) comprises gradually introducing a polyolefin into a volume of at least one diluent, said diluent being agitated by a powered agitator at a first temperature T1, and wherein step a2) is performed in a container (1) which is not the main olefin polymerization reactor, preferably wherein step a2) is performed in a continuously agitated container (1).

15. The process according to any one of statements 1 to 14, wherein the data obtained in step b1) or b2) are visualized as a graph plotting the power consumption as a function of the concentration at a given temperature or as a graph plotting the power consumption as a function of the temperature at a given concentration.

16. The process according to any one of statements 1 to 15, wherein the data obtained in step b1) or b2) are visualized as a graph plotting the power consumption as a function of the concentration at a given temperature or as a graph plotting the power consumption as a function of the temperature at a given concentration, wherein said set of one or more operating conditions comprises one or more combinations of concentration and temperature and wherein the polyolefin is polyethylene, preferably metallocene-catalyzed polyethylene.

17. The process according to any one of statements 1 to 16, wherein the data obtained in step c1) or c2) are visualized as a graph plotting the concentration at which the power consumption of the agitator reaches a critical point as a function of the temperature or as a graph plotting the temperature at which the power consumption of the agitator reaches a critical point as a function of the concentration.

18. The process according to any one of statements 1 to 17, wherein the data obtained step c1) or c2) are visualized as a graph plotting the concentration at which the power consumption of the agitator reaches a critical point as a function of the temperature or as a graph plotting the temperature at which the power consumption of the agitator reaches a critical point as a function of the concentration, wherein said set of one or more operating conditions comprises one or more combinations of concentration and temperature and wherein the polyolefin is polyethylene, preferably metallocene-catalyzed polyethylene.

19. The process according to any one of statements 1 to 18, further comprising the step of fitting a curve to the data of step c1) or c2), more preferably fitting a curve to the critical points obtained from the data of step c1) or c2), in a graph plotting temperature versus concentration or concentration versus temperature.

20. The process according to any one of statements 1 to 19, further comprising the step of fitting a curve to the data of step c1) or c2), more preferably fitting a curve to the critical points obtained from the data of step c1) or c2), in a graph plotting temperature versus concentration or concentration versus temperature, wherein the set of one or more operating conditions are in the area under the curve, and optionally on the curve.

21. The process according to any one of statements 1 to 20, further comprising the step of fitting a curve to the data of step c1) or c2), more preferably fitting a curve to the critical points obtained from the data of step c1) or c2), in a graph plotting temperature versus concentration or concentration versus temperature, wherein the set of one or more operating conditions comprises the area under the curve, and optionally on the curve.

22. The process according to any one of statements 1 to 21, wherein the critical point is defined as the intersection of the asymptote with the tangent at the origin of the fitted curve.

23. The process according to any one of statements 1 to 22, wherein the critical point is defined as the point $(x_{i+1};y_{i+1})$ from the discrete set of m experimental points $(x_i;y_i)$ with x being the abscissa and y being the ordinate, $i\epsilon[1;m]$ and m being the number of total experimental points, whereby the computed value $a_i$ is defined as $$a_i = \frac{y_{i+1} - y_i}{x_{i+1} - x_i}$$

for each $i\epsilon[1;m]$, for the value i for which $a_{i+1}>1.02\times a_i$, more preferably for which $a_{i+1}>1.05\times a_i$, more preferably for which $a_{i+1}>1.1\times a_i$.

24. The process according to any one of statements 1 to 23, wherein the critical point is defined as the intersection of the lines passing through points $(x_{i+1};y_{i+1})$; $(x_i;y_i)$ on the one hand and $(x_m;y_m)$; $(x_{m-1};y_{m-1})$ on the other hand, obtained from the discrete set of m experimental points $(x_i;y_i)$ with x being the abscissa and y being the ordinate, $i\epsilon[1;m]$ and m being the number of total experimental points, whereby the computed value $a_i$ is defined as $$a_i = \frac{y_{i+1} - y_i}{x_{i+1} - x_i}$$

for each $i\epsilon[1;m]$, for the value i for which $a_{i+1}>1.02\times a_i$, more preferably for which $a_{i+1}>1.05\times a_i$, more preferably for which $a_{i+1}>1.1\times a_i$.

25. The process according to any one of statements 1 to 24, wherein the critical point $(x_c;y_c)$ is defined as the solution of the following 2 equation system:

$$y_c=a_i\times x_c+(y_i-a_i\times x_i)$$

$$y_c=a_{m-1}\times x_c+(y_{m-1}-a_{m-1}\times x_{m-1}),$$

obtained from the discrete set of m experimental points $(x_i;y_i)$ with x being the abscissa and y being the ordinate, $i\epsilon[1;m]$ and m being the number of total experimental points, whereby the computed value $a_i$ is defined as $$a_i = \frac{y_{i+1} - y_i}{x_{i+1} - x_i}$$

for each $i\epsilon[1;m]$, for the value i for which $a_{i+1}>1.02\times a_i$, more preferably for which $a_{i+1}>1.05\times a_i$, more preferably for which $a_{i+1}>1.1\times a_i$.

26. The process according to any one of statements 1 to 25, wherein the critical point is obtained by calculating the derivative of the fitted curve, and by defining the critical point as $(x_{i+1};y_{i+1})$, for the value i for which $d_{i+1}>1.02\times d_i$, more preferably for which $d_{i+1}>1.05\times d_i$, more preferably for which $d_{i+1}>1.1\times d_i$, wherein the derivative value $d_i$, is calculated of each one of n points $i\epsilon[1;n]$ in the range of m points.

27. The process according to any one of statements 1 to 26, comprising the steps of: a1) gradually introducing a polyolefin into a volume of at least one diluent, said diluent being continuously agitated by a powered agitator at a first temperature T1; b1) monitoring the power consumed by the agitator as a function of the concentration and recording the maximum concentration of the polyolefin that is within a zone of steadily increasing power consumption by the agitator c1) repeating steps a1) and b1) at two or more subsequent temperatures T2 and Tn which are different from each other and from T1; d1) plotting on a graph said maximum concentration of step a1) as a function of the temperatures T1, T2, . . . , Tn, and determining from power consumed by the agitator as a function of polyolefin concentration, said set of one or more operating conditions for the synthesis of the polyolefin in the olefin polymerization reactor.
28. The process according to any one of statements 1 to 27 comprising the steps of: a2) introducing a polyolefin into a volume of at least one diluent, said diluent being continuously agitated by a powered agitator at a first concentration C1; b2) gradually modifying the temperature and monitoring the power consumed by the agitator as a function of the temperature and recording the maximum temperature that is within a zone of steadily increasing power consumption by the agitator c2) repeating steps a2) and b2) at two or more subsequent concentrations C2 and Cn which are different from each other and from C1; d2) plotting on a graph said maximum temperature of step a2) as a function of the concentrations C1, C2, . . . , Cn, and determining from power consumed by the agitator as a function of temperature, said set of one or more operating conditions for the synthesis of the polyolefin in the olefin polymerization reactor.
29. The process according to any one of statements 1 to 28, wherein the maximum concentration of the polyolefin for a given temperature is defined as the concentration (concentration of solid olefin in the diluent) (in the container) that leads to a consumption of power by the agitator that is at least 10% higher, at least 15% higher, or at least 20% higher than the power consumed by the agitator agitating the diluent alone at the given temperature.
30. The process according to any one of statements 1 to 29, wherein the maximum temperature of the polyolefin for a given concentration is defined as the temperature in the container that leads to a consumption of power by the agitator that is at least 10% higher, at least 15% higher, or at least 20% higher than the power consumed by the agitator agitating the diluent alone at the given concentration.
31. The process according to any one of statements 1 to 30, wherein said olefin polymerization reactor comprises at least one loop reactor.
32. The process according to any one of statements 1 to 31, wherein said olefin polymerization reactor comprises a double loop reactor.
33. The process according to any one of statements 1 to 32, further comprising the step of:
e) analyzing catalyst yield as a function of the operating conditions.
34. The process according to any one of statements 1 to 33, further comprising the step of:
f) selecting operating conditions from said set of one or more operating conditions obtained in step d1) or d2) for the synthesis of the polyolefin in the olefin polymerization reactor to maximize catalyst yield, based on the analysis performed in step e).
35. The process according to any one of statements 1 to 34, further comprising the step of:
e) analyzing catalyst yield as a function of the operating conditions, wherein the operating conditions comprise concentration and temperature.
36. The process according to any one of statements 1 to 35, further comprising the step of:
f) selecting operating conditions from said set of one or more operating conditions obtained in step d1) or d2) for the synthesis of the polyolefin in the olefin polymerization reactor to maximize catalyst yield, based on the analysis performed in step e), wherein the operating conditions comprise concentration and temperature.
37. A process for operating an olefin polymerization reactor in slurry condition, using the process of any one of statements 1 to 36.
38. Process for preparing a polyolefin comprising the steps of:
receiving a set of one or more operating conditions of an olefin polymerization reactor previously obtained using the process of any one of statements 1 to 36; and
operating said olefin polymerization reactor at operating conditions within the set of one or more operating conditions obtained in step i).
39. The process according to statement 37 or 38, wherein said process comprises the steps of: feeding an olefin monomer, a diluent, at least one catalyst, optionally hydrogen, and optionally one or more olefin co-monomers into at least one polymerization reactor; and performing the polymerization of the monomer, the optionally one or more olefin co-monomers, in the presence of the catalyst, and optional hydrogen, using the set of one or more operating conditions obtained in step i) to produce a polyolefin.
40. A process for preparing a polyolefin, comprising the steps of feeding an olefin monomer, a diluent, at least one catalyst, optionally hydrogen, and optionally one or more olefin co-monomers into at least one polymerization reactor; and polymerizing the monomer, the optionally one or more olefin co-monomers, in the presence of the catalyst, and optional hydrogen, using the set of one or more operating conditions obtained using the process of any one of statements 1 to 36 to produce the polyolefin.
41. A process for operating an olefin polymerization reactor in slurry condition, comprising the steps of:
i) receiving a set of one or more operating conditions of an olefin polymerization reactor previously obtained according to the process of any one of statements 1 to 36; and
ii) operating said olefin polymerization reactor at operating conditions within the set of one or more operating conditions obtained in step i).
42. A process for operating an olefin polymerization reactor in slurry condition, comprising the steps of:
i) receiving a set of one or more operating conditions of an olefin polymerization reactor previously obtained according to the process of any one of statements 1 to 36; and
ii) operating said olefin polymerization reactor at operating conditions within the set of one or more operating conditions obtained in step i);
wherein the operating conditions comprise concentration and temperature.
43. A process for operating an olefin polymerization reactor in slurry condition, comprising the steps of:
i) receiving a set of one or more operating conditions of an olefin polymerization reactor previously obtained according to the process of any one of statements 1 to 36; and
ii) operating said olefin polymerization reactor at operating conditions within the set of one or more operating conditions obtained in step i);
wherein the operating conditions comprise concentration and temperature,
and wherein the polyolefin is polyethylene, preferably metallocene-catalyzed polyethylene.
44. The process according to any one of statements 41 to 43, wherein step ii) comprises the steps of: feeding a diluent and at least one olefin-containing hydrocarbon feedstock into said polymerization reactor; converting at least part of the olefins contained in said hydrocarbon feedstock, in the presence of at least one catalyst, into a polyolefin product; and recovering the polyolefin product.

45. The process according to any one of statements 41 to 44, wherein step ii) comprises the steps of:
   ii') obtaining the actual operating conditions of the olefin polymerization reactor;
   ii") comparing the actual operating conditions of the olefin polymerization reactor to the set of one or more operating conditions of an olefin polymerization received in step i);
   ii''') if necessary, adapting the operating conditions such that the actual operating conditions fall within the set of one or more operating conditions received in step i).

46. The process according to any one of statements 41 to 45, wherein step ii) comprises the steps of:
   ii') obtaining the actual operating conditions of the olefin polymerization reactor;
   ii") comparing the actual operating conditions of the olefin polymerization reactor to the set of one or more operating conditions of an olefin polymerization received in step i);
   ii''') if necessary, adapting the operating conditions such that the actual operating conditions fall within the set of one or more operating conditions received in step i);
   wherein the operating conditions comprise concentration and temperature.

47. The process according to any one of statements 41 to 46, wherein step ii) comprises the steps of:
   ii') obtaining the actual operating conditions of the olefin polymerization reactor;
   ii") comparing the actual operating conditions of the olefin polymerization reactor to the set of one or more operating conditions of an olefin polymerization received in step i);
   ii''') if necessary, adapting the operating conditions such that the actual operating conditions fall within the set of one or more operating conditions received in step i);
   wherein the operating conditions comprise concentration and temperature,
   and wherein the polyolefin is polyethylene, preferably metallocene-catalyzed polyethylene.

48. A process according to any one of statements 37 to 47 further comprising the step of using one or more by-pass lines.

49. A process according to any one of statements 41 to 48 further comprising the step of using one or more by-pass lines for performing step ii).

The present invention encompasses processes for controlling, avoiding and/or reverting polymerization related issues such as hydrodynamic instabilities and fouling in a slurry loop reactor. In some preferred embodiments, the invention provides means to operate in the most advantageous conditions while remaining in the safe side limit of both solid concentration and temperature in the loop reactors. Furthermore, the present invention provides processes to find ideal/optimized operating conditions of polymerization process for a polyolefin having specified density, melt index and molecular weight distribution. Therefore, the processes according to the present invention provide ideal/optimized conditions separately for each polyolefin polymerization process.

The present invention encompasses a process for determining a set of one or more operating conditions of an olefin polymerization reactor for the synthesis of a polyolefin in slurry condition, comprising the steps of:
   a1) introducing a polyolefin into a volume of at least one diluent, said diluent being agitated by a powered agitator at a first temperature $T1$;
   b1) monitoring the power consumed by the agitator as a function of the concentration, for at least three concentrations $C1$, $C2$, and $Cn$, which are different from each other;
   c1) repeating steps a1) and b1) at two or more subsequent temperatures $T2$ and $Tn$ which are different from each other and from $T1$;
   d1) determining from the power consumed by the agitator as a function of concentration, said set of one or more operating conditions for the synthesis of the polyolefin in the olefin polymerization reactor;
or
   a2) introducing a polyolefin into a volume of at least one diluent, said diluent being agitated by a powered agitator, at a first concentration $C1$;
   b2) monitoring the power consumed by the agitator as a function of the temperature, for at least three temperatures $T1$, $T2$, and $Tn$, which are different from each other;
   c2) repeating steps a2) and b2) at two or more subsequent concentrations $C2$ and $Cn$, which are different from each other and from $C1$;
   d2) determining from the power consumed by the agitator as a function of temperature, said set of one or more operating conditions for the synthesis of the polyolefin in the olefin polymerization reactor.

As used herein, the term "introducing" comprises introducing a previously synthesized polyolefin, but also comprises actually synthesizing the polyolefin in the volume of the diluent. The polyolefin may have been synthesized prior to step a1). The polyolefin may be synthesized during step a1).

Preferably, during step d1) or d2) the set of one or more operating conditions is determined by examination of pump power. At a given temperature (or concentration) increasing solid concentration (or temperature, respectively) will give little to no increase in pump or agitator power consumption until a critical point where pump or agitator power will increase sharply.

The present invention encompasses processes to obtain ideal/optimized operating conditions for processes for the synthesis of a polyolefin, and processes for preparing said polyolefin, wherein a monomer and optional one or more co-monomer(s) are polymerized in a loop reactor to prepare the polyolefin. More specifically, the present invention provides individually optimized operating conditions for processes for the synthesis of each polyolefin having specific molecular weight distribution, density and melt index.

As used herein, the term "set of one or more operating conditions" refers to one or more obtained operating conditions, i.e. operating conditions which prevent the aforementioned problems. This set may be a discrete set or a continuous set. In some preferred embodiments, the set is defined as the area under or above a specific curve or (hyper)plane in a diagram plotting two or more operating conditions. Optionally, the area under or above a specific curve may comprise the curve itself.

By operating conditions are meant, conditions under which the synthesis of a polyolefin in a polymerization reaction takes a place. Operating conditions can be for example, temperature, pressure, power, and polyolefin concentration as well as monomer and co-monomer concentration.

As used herein, the term "concentration" refers to polyolefin concentration. Typically this is the solids concentration or solids content of solid polyolefin particles in a liquid diluent. It is to be understood that in the description below, the terms "solid content" and "polyolefin concentration" may be substituted for one another. Polyolefin concentration can be expressed as a volume fraction (volume of polyolefin divided by total volume) or weight fraction (weight of polyolefin divided by total weight). In the present application, the fraction is the weight fraction, unless otherwise indicated. In some preferred embodiments, the operating conditions comprise temperature and concentration.

The polyolefins are preferably synthesized by polymerizing at least one olefin monomer, and optional co-monomer in the presence of at least one catalyst system, optionally diluent, and optional molecular weight regulator such as hydrogen.

The polyolefins prepared for the purposes of the present process may be any olefin homopolymer or any copolymer of an olefin and one or more co-monomers. Suitable "olefin polymerization" includes, but is not limited to, homo-polymerization of an olefin or co-polymerization of an olefin monomer and at least one olefin co-monomer. The term "homo-polymer" refers to a polymer which is made by linking olefin monomers, in the absence of co-monomers. The term "co-polymer" refers to a polymer, which is made by linking two different types of monomers in the same polymer chain.

As used herein, the term "monomer" refers to an olefin compound that is to be polymerized. The olefin can for example be ethylene, propylene, 1-butene, 1-pentene, 1-hexene, 4-methyl-1-pentene or 1-octene, but also cycloolefins such as for example cyclopentene, cyclohexene, cyclooctene or norbornene. Preferred examples of olefin monomers are ethylene and propylene, most preferably ethylene. In some embodiments, the present process is directed to the polymerization of ethylene. As used herein, the term "co-monomer" refers to olefin co-monomers which are suitable for being polymerized with olefin monomers. Co-monomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene, preferably 1-hexene.

The term "polyethylene resin" as used herein refers to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a short hand for "polyethylene resin".

The term "fluff" as used herein refers to polyethylene material with the hard catalyst particle at the core of each grain and is defined as the polymer material after it exits the polymerization reactor (or the final polymerization reactor in the case of multiple reactors connected in series).

As used herein, the term "catalyst" refers to a substance that causes a change in the rate of a polymerization reaction. In the present process, it is especially applicable to catalysts suitable for the polymerization of olefin to polyolefin such as ethylene to polyethylene. The present processes are preferably applicable to the polyolefin such as polyethylene prepared in the presence of catalyst, such as chromium, Ziegler-Natta or metallocene catalyst. Amongst these catalysts, metallocene catalysts are preferred. As used herein, the terms "metallocene-catalyzed polyethylene resin", and "metallocene-catalyzed polyethylene" are synonymous and used interchangeably and refers to a polyethylene prepared in the presence of a metallocene catalyst.

The term "Ziegler-Natta catalyst" or "ZN catalyst" refers to catalysts having a general formula $M^1X_v$, wherein $M^1$ is a transition metal compound selected from Group 4 to 7, wherein X is a halogen, and wherein v is the valence of the metal. Preferably, $M^1$ is a Group 4, Group 5 or Group 6 metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use herein are described in U.S. Pat. Nos. 6,930,071 and 6,864,207, which are incorporated herein by reference. Suitable Ziegler-Natta catalyst system, include systems comprising a titanium compound having at least one titanium-halogen bond and an internal electron donor, both on a suitable support (for example on a magnesium halide in active form), an organo-aluminium compound (such as an aluminium trialkyl), and an optional external donor.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

Preferably the polyolefin is prepared in the presence of a metallocene catalyst. The term "metallocene catalyst" or "metallocene" for short is used herein to describe any transition metal complexes comprising metal atoms bonded to one or more ligands. The preferred metallocene catalysts are compounds of Group 4 transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes typically comprise a single metal site, which allows for more control of branching and molecular weight distribution of the polymer. Monomers are inserted between the metal and the growing chain of polymer.

In some embodiments, the metallocene catalyst is a compound of formula (I) or (II)

$$(Ar)_2MQ_2 \qquad (I);$$

$$\text{or } R''(Ar)_2MQ_2 \qquad (II),$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, and a hydrocarbyl having 1 to 20 carbon atoms, and wherein said hydrocarbyl optionally contains one or more atoms selected from the group comprising B, Si, S, O, F, and P;

wherein M is a transition metal selected from the group consisting of titanium, zirconium, hafnium, and vanadium; and preferably is zirconium;

wherein each Q is independently selected from the group consisting of halogen, a hydrocarboxy having 1 to 20 carbon atoms, and a hydrocarbyl having 1 to 20 carbon atoms and wherein said hydrocarbyl optionally contains one or more atoms selected from the group comprising B, Si, S, O, F, and P; and wherein R" is a divalent group or moiety bridging the two Ar groups and selected from the group consisting of $C_1$-$C_{20}$ alkylene, germanium, silicon, siloxane, alkylphosphine, and an amine, and wherein said R" is optionally substituted with one or more substituents each independently selected from the group consisting of halogen, a hydrocarbyl having 1 to 20 carbon atoms, and wherein said hydrocarbyl optionally contains one or more atoms selected from the group comprising B, Si, S, O, F, and P.

Preferably, the metallocene comprises a bridged bis-indenyl and/or a bridged bis-tetrahydrogenated indenyl catalyst component. In some embodiments, the metallocene can be selected from one of the following formula (IVa) or (IVb):

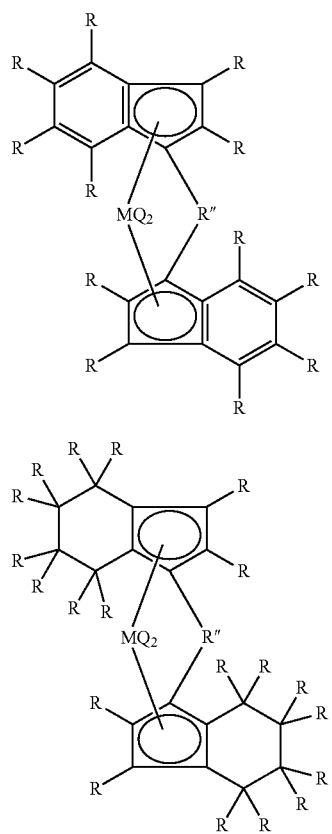

wherein each R in formula (IVa) or (IVb) is the same or different and is independently selected from hydrogen or $XR'_v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a $C_1$-$C_4$-alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal from Group 4 of the Periodic Table or vanadium, preferably M is selected from the group consisting of titanium, zirconium, hafnium, and vanadium; and preferably is zirconium.

Each indenyl or tetrahydro indenyl component may be substituted with R in the same way or differently from one another at one or more positions of either of the fused rings. Each substituent is independently chosen. If the cyclopentadienyl ring is substituted, its substituent groups are preferably not so bulky so as to affect coordination of the olefin monomer to the metal M. Any substituents XR'v on the cyclopentadienyl ring are preferably methyl. More preferably, at least one and most preferably both cyclopentadienyl rings are unsubstituted. In some particularly preferred embodiments, the metallocene comprises a bridged unsubstituted bis-indenyl and/or a bridged unsubstituted bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl)zirconium dichloride or ethylene-bis (tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups, preferably methoxy, ethoxy, butoxy and amyloxy.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$ As used herein, the term "cycloalkyl", by itself or as part of another substituent, refers to a saturated or partially saturated cyclic alkyl radical. Cycloalkyl groups have the general formula $C_nH_{2n+1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3,4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to refers to an alkyl group as defined herein, wherein a hydrogen atom is replaced by an aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, C1-C20 alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are preferably provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In some preferred embodiments, the metallocene catalyst is provided on a solid support, preferably a silica support. The silica may be in granular, agglomerated, fumed or other form.

In some embodiments, the support of the metallocene catalyst is a porous support, and preferably a porous silica support having a surface area comprised between 200 and 900 $m^2$/g. In some embodiments, the support of the polymerization catalyst is a porous support, and preferably a porous silica support having an average pore volume comprised between 0.5 and 4 ml/g. In some embodiments, the support of the polymerization catalyst is a porous support, preferably as described in US2013/0211018 A1, hereby incorporated in its entirety by reference.

In some embodiments, the support has a D50 of at most 150 μm, preferably of at most 100 μm, preferably of at most 75 μm, preferably of at most 50 μm, preferably of at most 25 μm, preferably of at most 15 μm, preferably of at most 10 μm, preferably of at most 8 μm. The D50 is defined as the particle size for which fifty percent by weight of the particles has a size lower than the D50.

The measurement of the particle size can be made according to the International Standard ISO 13320:2009 ("Particle size analysis—Laser diffraction methods"). For example, the D50 can be measured by sieving, by BET surface measurement, or by laser diffraction analysis. Preferably, the support particle size is measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

In some embodiments, the support has a D50 of at most 150 μm, preferably of at most 100 μm, preferably of at most 75 μm, preferably of at most 50 μm, preferably of at most 25 μm, preferably of at most 15 μm, preferably of at most 10 μm, preferably of at most 8 μm. The D50 is defined as the particle size for which fifty percent by weight of the particles has a size lower than the D50, as measured according to the International Standard ISO 13320:2009 ("Particle size analysis—Laser diffraction methods") with the Mastersizer S by applying the theory of Mie.

Preferably, the supported metallocene catalyst is activated. The activating agent, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In some embodiments, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In some embodiments, alumoxanes comprise oligomeric linear and/or cyclic alkyl alumoxanes. In some embodiments, the alumoxane has formula (V) or (VI)

$R^a$—(Al($R^a$)—O)$_x$—Al$R^a_2$ (V) for oligomeric, linear alumoxanes; or (—Al($R^a$)—O—)$_y$ (VI) for oligomeric, cyclic alumoxanes wherein x is 1-40, and preferably 10-20;
wherein y is 3-40, and preferably 3-20; and
wherein each $R^a$ is independently selected from a $C_1$-$C_8$alkyl, and preferably is methyl. In some preferred embodiments, the alumoxane is methylalumoxane (MAO).

In some preferred embodiments, the metallocene catalyst is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula Al$R^b_x$ can be used as additional co-catalyst, wherein each Rb is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

The catalyst is preferably added to the loop reactor as catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form sediment or deposit.

For examples, for a resin of 918 kg/m³ using a metallocene catalyst, ideal temperatures for a solid content between 30 to 50% w would be between 70 and 90° C. more ideally between 75 to 85° C. and ideally around 80° C.

The polymerization steps in the reactor can be performed over a wide temperature range. In certain embodiments, the polymerization step in the reactor may be performed at a temperature from 20° C. to 125° C., preferably from 60° C. to 110° C., more preferably from 70° C. to 100° C., and most preferably from 75° C. to 98° C., for example from 78° C. to 95° C.

In certain embodiments, the polymerization step in the reactor may be performed at a pressure from about 20 bar to about 100 bar, preferably from about 30 bar to about 50 bar, and more preferably from about 37 bar to about 45 bar.

The inventors have found that, for each polyolefin slurry polymerization, at any particular solid concentration, instabilities may occur. Therefore, it is important to identify a maximum solid concentration, which can be maintained in the slurry polymerization reactor at an optimum temperature without instabilities. In other words, it is important to identify a maximum solid concentration at an optimum temperature. It is noted here that a "general" maximum solid concentration is not applicable for all different polyolefins. Therefore, the maximum solid concentration is preferably determined for each polyolefin having specific density, molecular weight distribution and melt index individually.

However, the solid concentration of the slurry is not the only factor which causes hydrodynamic instabilities and fouling in the slurry loop reactors. The inventors have found that temperature also has a role in hydrodynamic instabilities and fouling.

The polymerization temperature within the reactor is dependent on the desired end product. Generally, the higher the temperature, the more productive the catalyst will be. However, on the other hand, the higher the temperature, the higher the risk of swelling will be. As a general rule, it can be said that the higher the desired density of the final polyethylene, i.e. the lower the co-monomer concentration in the reaction medium, the higher the polymerization temperature in the reactor can be maintained without the risk of swelling.

The inventors have found that, for each polyolefin slurry polymerization, at any particular temperature, instabilities can occur. Therefore, it is important to identify an optimum temperature which can be maintained while having maximum solid concentration in the reactor without causing instabilities. It is noted here that a "general" optimal temperature is not applicable for all different polyolefins having specific density, molecular weight distribution, and melt index. Therefore, the optimal temperature is preferably determined for each polyolefin having specific density, molecular weight distribution and melt index individually.

In some preferred embodiments, step a1) comprises gradually introducing a polyolefin into a volume of at least one diluent, said diluent being agitated by a powered agitator at a first temperature T1. In some preferred embodiments, step a2) comprises introducing a polyolefin into a volume of at least one diluent, said diluent being agitated by a powered agitator, at a first concentration C1, and gradually changing the temperature.

As used herein and in what follows, the term "gradually" may encompass a continuous change, a plurality of discrete (or stepwise) changes, or a combination of both. In some preferred embodiments, the term "gradually changing" comprises "changing along a plurality of discrete steps".

In step a1) or a2) of the process, the synthesized polyolefin is added, preferably gradually, over time into a container comprising at least one diluent. The container suitable for use herein can be for example a glass container or a jacketed glass vessel. Preferably a jacketed vessel, preferably a jacketed glass vessel is used. It is noted that the container of step a1) or a2) is preferably not the main reactor wherein the actual polyolefin synthesis takes a place. For example, when the main reactor is a single loop or a double loop reactor, the container may be a glass container, or a glass vessel. Alternatively a "baby loop", for example a loop reactor that is at most 10% the size of the main reactor, for example at most 5% the size of the main reactor, may be used as a container. In some embodiments, the container is the main reactor or an equivalent reactor. The container to be used may depend on the liquid diluents that need to be tested (preferably the same liquid diluent that is used in the reactor). For example, if heptane is used, a jacketed container may suffice, for example a jacketed glass container. If isobutane is to be tested, then a vessel withstanding pressure is preferred, for example a bench scale reactor.

As used herein, the term "diluent" refers to any organic diluent, which typically does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Non-limiting illustrative examples of solvents are isobutane, heptane, hexane, butane, pentane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

Gradual addition of polyolefin can be done in steps starting from 0.0% of solid concentration by weight of the diluent, and increasing the solid concentration gradually step by step. Equally the gradual increase can be done in even steps, for example of 5.0% per step, preferably of 2.0% per step, more preferably of 1.0% per step, by weight of the diluent. For example, gradual addition of polyolefin can be done in steps from 0.0% to 1.0%, to 2.0%, to 3.0%, to 4.0%, to 5.0%, to 6.0% and so on until instabilities are observed. The instabilities observed are typically the effect of swelling.

While polyolefin is added, preferably gradually added, into a container comprising a diluent the formed slurry of polyolefin and diluent is preferably agitated. Preferably, gradual addition of polyolefin is performed in a continuously agitated container. Agitation can be performed by a powered agitator, which can be an electrically powered motor.

The polymerization temperature of polyolefin ranges generally from 20° C. to 125° C. Therefore, the first temperature, T1, and subsequent temperatures T2, . . . , Tn are preferably within this range. The first temperature (T1) of step a1) or a2) is preferably lower than the subsequent temperatures T2, . . . , Tn in the step c1) or c2). The steps a1)-b1) or a2)-b2) are preferably repeated for at least three different temperatures: T1, and at least two subsequent temperatures T2 and T3. Alternatively, steps a1)-b1) or a2)-b2) can be repeated at four, five or six different temperatures. Preferably steps a1)-b1) or a2)-b2) are repeated four times at four different temperatures: T1, T2, T3 and T4. For example temperatures T1 to T4 can be 20° C., 48° C., 68° C. and 85° C. as used in the examples.

In some preferred embodiments, the temperature is gradually raised. Gradual raise of the temperature can be done in steps starting from 20° C., and increasing the temperature gradually step by step. Equally, the gradual increase can be done in even steps, for example of 5° C. per step, preferably of 2° C. per step, more preferably of 1° C. per step, by weight of the diluent. For example, gradual increase of the temperature can be done in steps of at most 5° C., at most 4° C., at most 3° C., at most 2° C., at most 1° C. and so on until instabilities are observed. The instabilities observed are typically the effect of swelling.

To maintain the process temperature as accurate and stable as possible, the process temperature in the container may be thermostatically controlled. A thermostat is a component of a control system which senses the temperature of a system so that the system's temperature is maintained near a desired set point. A thermostat may be a control unit for a heating system or a component part of a heater. Thermostats can be constructed in many ways and may use a variety of sensors to measure the temperature.

In some embodiments, in the process the power consumed by the agitator is monitored and it is preferably recorded. As used herein, the term "power consumption" also comprises alternative methods of monitoring power consumption, such as a visual parameter of the agitator, rotation speed, intensity, or the like. In some embodiments, the agitator is monitored visually. In some embodiments, the rotation speed of the agitator is monitored. In some embodiments, the intensity of the agitator is monitored.

Preferably, the data obtained in step b1) can be visualized as a graph plotting the power consumption as a function of the polyolefin concentration or solids content at each temperature. The graph may comprise discrete data points, and/or may comprise a continuous curve fitted to the data points.

Preferably, the data obtained in step b2) can be visualized as a graph plotting the power consumption as a function of the temperature at each polyolefin concentration or solids content. The graph may comprise discrete data points, and/or may comprise a continuous curve fitted to the data points.

Steps a1)-b1) are preferably performed for all temperatures T1, . . . Tn. Steps a2)-b2) are preferably performed for all solid concentrations C1, . . . Cn. In some embodiments, knowledge of previous steps is used to skip measurements from certain selected temperatures or concentrations.

In step d1) or d2), operating conditions for the synthesis of the polyolefin in the olefin polymerization reactor can be determined from power consumption by the agitator as function of concentration or temperature. During step d1) or d2), the data obtained in step c1) or c2) can be visualized as a graph plotting the concentration at which the power consumption of the agitator reaches the critical point as a function of the temperature, or as a graph plotting the temperature at which the power consumption of the agitator reaches the critical point as a function of the concentration. Preferably, the maximum concentration is plotted on a graph as a function of the temperatures T1, T2, . . . , Tn. Preferably, the maximum temperature is plotted on a graph as a function of the concentration C1, C2, . . . , Cn. Furthermore, a curve is preferably fitted to the data of step c1) or c2), preferably a curve is fitted to the critical points obtained from the data of step c1) or c2).

By the term "critical point" is meant the point in the curve, where the polyolefin is stable in the slurry, but shortly after this point is unstable. This change from the stable to unstable can be seen as sudden peak in power consumption of the agitator. The term "critical point" may be mathematically defined as the intersection of the asymptote with the tangent at the origin of the curve issued from the experimental points, as shown in FIG. 3. Below, several methods exemplify how the critical point may be obtained. Alternatively, the critical point may be obtained through a graphical method or another mathematical, numerical method.

Method 1: Discrete Set of Point Analysis

From the discrete set of m experimental points $(x_i; y_i)$ with x being the abscissa and y being the ordinate, $i \in [1;m]$ and m being the number of total experimental points, computing the value defined as $$a_i = \frac{y_{i+1} - y_i}{x_{i+1} - x_i}$$

for each $i \in [1;m]$.

Analyzing then the values of $a_i$ for each $i \in [1;m]$. When $a_{i+1} > 1.02 \times a_i$, more preferably $a_{i+1} > 1.05 \times a_i$, or even more preferably when $a_{i+1} > 1.1 \times a_i$, then the point defined as $(x_{i+1}; y_{i+1})$ is a close match to the critical point.

If $a_i$ is 0 for i belonging to the set [1;m], then the set of experimental points is preferably enlarged to [1;p] with $p > m$.

In another embodiment the $a_i$ are analyzed for each $i \in [1;m]$ with m being the total number of experimental points. When $a_{i+1} > 1.02 \times a_i$, more preferably $a_{i+1} > 1.05 \times a_i$, or even more preferably when $a_{i+1} > 1.1 \times a_i$, the critical point is calculated as being the intersection of the lines passing through points $(x_{i+1}; y_{i+1})$; $(x_i; y_i)$ on the one hand and $(x_m; y_m)$; $(x_{m-1}; y_{m-1})$ on the other hand.

A close match to the critical point $(x_c; y_c)$ can then be calculated by solving the following 2 equation system:

$$y_c = a_i \times x_c + (y_i - a_i \times x_i)$$

$$y_c = a_{m-1} \times x_c + (y_{m-1} - a_{m-1} \times x_{m-1})$$

Method 2: Curve Fitting Method

This method consists of curve fitting tools in order to obtain the best suitable equation for the experimental data. Curve fitting tools such as SCILAB, OCTAVE, MATLAB, TABLE CURVE can be used as an example. Manual fitting using a set of predefined equations can also be done.

Once the best fitting curve has been determined (visual analysis of fitted curve or analysis of correlation coefficients) the derivative of the equation is calculated. With the derivative equation a set of n points are taken in the range of the m experimental points. The derivative value $d_i$, is calculated of each one of the n points $i \in [1;n]$. When $d_{i+1} > 1.02 \times d_i$ or most preferably $d_{i+1} > 1.05 \times d_i$ or even most preferably when $d_{i+1} > 1.1 \times d_i$, then the point defined as $(x_{i+1}; y_{i+1})$ is a close match to the critical point.

In another embodiment, with the best fitting curve the tangent at the origin and the asymptote are computed. The intersection is a close match to the critical point. The intersection is illustrated in FIG. 3. In some preferred embodiments, the process further comprises the steps of a1) recording the maximum concentration that is within a zone of steadily increasing power consumption by the agitator; b1-c1) plotting on a graph said maximum concentration of step a1) as a function of the temperatures T1, T2, . . . , Tn; d1) determining from the graph the set of one or more stable operating conditions for the synthesis of the polyolefin in the olefin polymerization reactor.

In some preferred embodiments, the process further comprises the steps of a2) recording the maximum temperature that is within a zone of steadily increasing power consumption by the agitator; b2-c2) plotting on a graph said maximum temperature of step a2) as a function of the concentrations C1, C2, . . . , Cn; d2) determining from the graph the set of one or more stable operating conditions for the synthesis of the polyolefin in the olefin polymerization reactor.

By the term "zone of steadily increasing" is meant a zone of controlled gradual increase of consumed power without any sudden peaks in the power consumption.

In some preferred embodiments, the process comprises the steps of: a1) gradually introducing a polyolefin into a volume of at least one diluent, said diluent being continuously agitated by a powered agitator at a first temperature T1; b1) monitoring the power consumed by the agitator as a function of the concentration and recording the maximum concentration of the polyolefin that is within a zone of steadily increasing power consumption by the agitator c1) repeating steps a1) and b1) at two or more subsequent temperatures T2 and Tn which are different from each other and from T1; d1) plotting on a graph said maximum concentration of step a1) as a function of the temperatures T1, T2, . . . , Tn, and determining from power consumed by the agitator as a function of polyolefin concentration, said set of one or more stable operating conditions for the synthesis of the polyolefin in the olefin polymerization reactor.

In some preferred embodiments, the process comprises the steps of: a2) introducing a polyolefin into a volume of at least one diluent, said diluent being continuously agitated by a powered agitator at a first concentration C1; b2) gradually modifying the temperature and monitoring the power consumed by the agitator as a function of the temperature and recording the maximum temperature that is within a zone of steadily increasing power consumption by the agitator c2) repeating steps a2) and b2) at two or more subsequent concentrations C2 and Cn which are different from each other and from C1; d2) plotting on a graph said maximum temperature of step a2) as a function of the concentrations C1, C2, . . . , Cn, and determining from power consumed by the agitator as a function of temperature, said set of one or more stable operating conditions for the synthesis of the polyolefin in the olefin polymerization reactor.

The inventors have found that the optimal operating conditions are in the area under the curve. However, use of a by-pass line may allow operation just above the curve. Additionally, a by-pass line can be used temporarily to help in the situation where the temperature or concentration rises above the curve. Furthermore, a by-pass line allows for mixing along the longitudinal axis of a reactor. Local problems with swelling may be avoided by improved mixing along the longitudinal axis.

In some embodiments, the maximum concentration of the polyolefin for a given temperature is defined as the concentration in the container that leads to a consumption of power by the agitator that is at least 10% higher, at least 15% higher, or at least 20% higher than the power consumed by the agitator agitating the diluent alone at the given temperature.

In some embodiments, the maximum temperature for a given concentration of the polyolefin is defined as the temperature in the container that leads to a consumption of power by the agitator that is at least 10% higher, at least 15% higher, or at least 20% higher than the power consumed by the agitator agitating the diluent alone at the given concentration. In some embodiments, the maximum temperature for a given concentration of the polyolefin is defined as the temperature in the container that leads to nonlinearity in consumption of power by the agitator. In some embodiments, power consumption increase dramatically in a nonlinear manner.

In some embodiments, the maximum concentration of the polyolefin for a given temperature is defined as the concentration in the container that leads to a consumption of power by the agitator that is at least 10% higher, at least 15% higher, or at least 20% higher than the power consumed by the agitator agitating the diluent alone at the given concentration. In some embodiments, the maximum concentration for a given temperature of the polyolefin is defined as the concentration in the container that leads to nonlinearity in consumption of power by the agitator.

The process according to the first aspect, allows determining a set of one or more stable operating conditions of an olefin polymerization reactor for the synthesis of a given polyolefin in slurry condition.

The present process is particularly useful for determining for a given polyolefin to be synthesized suitable operating conditions for performing the polymerization in a slurry reactor and in particular in a slurry loop reactor. The present process is particularly suitable for polymerization in a slurry loop reactor comprising interconnected pipes defining a reactor path (loop). The loop reactor may be a single loop reactor or multiple loop reactor system comprising at least two reactors connected in series. In some embodiments, said loop reactor may further comprises on said interconnected pipes one or more by-pass pipes connecting two points of the same loop by an alternate route having a different transit time than that of the main route.

Preferably, the by-pass pipe runs parallel to the reactor path. Preferably, the by-pass pipe connects different parts of the reactor path, preferably the reactor path of the same loop reactor. Preferably, the by-pass pipe connects two points of the reactor path and more preferably, the by-pass pipe is connected to the reactor path in a bend or "elbow" of the reactor path to facilitate easy connection. Preferably, the diameter of the by-pass pipe (DB) is smaller than the diameter of the interconnected pipes (DL), more preferably the DB:DL ratio is from 1:12 to 1:2, more preferably from 1:6 to 1:3. Preferably, the interconnected pipes have a diameter of 51 to 61 cm (or 20-24 inch), for instance around 56 cm (or 22 inch). Preferably, the by-pass pipe has a diameter of from 10 to 30 cm (or 4-12 inch), for example around 15 cm (or 6 inch). Preferably, the by-pass has a different transit time for the slurry than the main reactor path. Preferably, the slurry flows in the main reactor path is from 5 m/s to 15 m/s. Preferably, the slurry in by-pass flows at a speed of higher than 7 m/s, more preferably higher than 10 m/s. Preferably, the by-pass line carriers a fraction of the slurry of from 0.5% to 50.0%, preferably of 1.0% to 15.0% of the total flow rate.

The present invention also encompasses a process for preparing a polyolefin, comprising the steps of feeding an olefin monomer, a diluent, at least one catalyst, optionally hydrogen, and optionally one or more olefin co-monomers into at least one polymerization reactor; and polymerizing the monomer, the optionally one or more olefin co-monomers, in the presence of the catalyst, and optional hydrogen, using the set of one or more stable operating conditions obtained using the process according to the first or second aspect of the invention.

In a third aspect, a process for operating an olefin polymerization reactor in slurry condition is also encompassed herein, said process using the process according to the first or second aspect of the invention. Preferred embodiments for the first or second aspect of the invention are also preferred embodiments for the third aspect of the invention. Preferably, the process for operating an olefin polymerization reactor in slurry condition comprises the steps of:
  i) receiving a set of one or more stable operating conditions of an olefin polymerization reactor previously obtained according to the process according to the first or second aspect of the invention; and
  ii) operating said olefin polymerization reactor at operating conditions within the set of one or more stable operating conditions obtained in step i).

Step ii) may comprise the steps of: feeding a diluent and at least one olefin-containing hydrocarbon feedstock into said polymerization reactor; and converting at least part of the olefins contained in said hydrocarbon feedstock, in the presence of at least one catalyst, into said polyolefin, and recovering the polyolefin product.

In some preferred embodiments, step ii) comprises the steps of:
  ii') obtaining the actual operating conditions of the olefin polymerization reactor;
  ii") comparing the actual operating conditions of the olefin polymerization reactor to the set of one or more stable operating conditions of an olefin polymerization received in step i);
  ii'") if necessary, adapting the operating conditions such that the actual operating conditions fall within the set of one or more stable operating conditions received in step i);

Preferably the process for operating an olefin polymerization reactor in slurry condition comprises the use of one or more by-pass lines. Preferably, the one or more by-pass lines are used to perform step ii). Preferably, the one or more by-pass lines are used to perform step ii"). Preferably the one or more by-pass lines are configured as disclosed in patent applications WO2012/013806, WO2004/026463, and/or WO2006/003144, herein incorporated in their entirety by reference. More preferably the one or more by-pass lines are configured according to preferred embodiments of patent applications WO2012/013806, WO2004/026463, and/or WO2006/003144.

In some embodiments, the process comprises the step of:
  e) analyzing catalyst yield as a function of concentration and temperature. For example, for a specific grade, certain catalysts can be tested for activity regarding concentration and temperature.

For example for a metallocene catalyst, the following conditions might be used:
  T=90° C., % w=30%→Productivity=10950 gPE/gcatalyst while producing a 934 kg/m³ resin; or
  T=80° C., % w=30%→Productivity=9850 gPE/gcatalyst while producing a 918 kg/m³ resin.

In some embodiments, the process comprises the step of:
  f) selecting operating conditions from said set of one or more operating conditions obtained in step d1) or d2) for the synthesis of the polyolefin in the olefin polymerization reactor to maximize catalyst yield, based on the analysis performed in step e).

Such an embodiment may be exemplified as follows:
Imagine n-heptane is the diluent and a metallocene catalyst is used with the following productivity profile:
  the productivity is linearly dependent of solid concentration; and,
  the productivity increases 20% every 10° C. in the range of 60 to 90° C.; the productivity is stable between 90° C. and 100° C., and the productivity decreases 20% every 10° C. above 100° C.

Imagine that reference productivity is obtained at 40% w solid concentration and 70° C. With the productivity profile it is possible to construct the following two dimensional Table 0, where productivities have been normalized regarding reference conditions.

TABLE 0

| | | T (° C.) | | | | | | | | | | |
|---|---|---|---|---|---|---|---|---|---|---|---|---|
| | | 60 | 62 | 64 | 66 | 68 | 70 | 72 | 74 | 76 | 78 | 80 | 82 |
| solids | 35 | 0.70 | 0.74 | 0.77 | 0.81 | 0.84 | 0.88 | 0.91 | 0.95 | 0.98 | 1.02 | 1.05 | 1.09 |
| (% w) | 35.5 | 0.71 | 0.75 | 0.78 | 0.82 | 0.85 | 0.89 | 0.92 | 0.96 | 0.99 | 1.03 | 1.07 | 1.10 |
| | 36 | 0.72 | 0.76 | 0.79 | 0.83 | 0.86 | 0.90 | 0.94 | 0.97 | 1.01 | 1.04 | 1.08 | 1.12 |
| | 36.5 | 0.73 | 0.77 | 0.80 | 0.84 | 0.88 | 0.91 | 0.95 | 0.99 | 1.02 | 1.06 | 1.10 | 1.13 |

TABLE 0-continued

| | | | | | | | | | | | | |
|---|---|---|---|---|---|---|---|---|---|---|---|---|
| 37 | 0.74 | 0.78 | 0.81 | 0.85 | 0.89 | 0.93 | 0.96 | 1.00 | 1.04 | 1.07 | 1.11 | 1.15 |
| 37.5 | 0.75 | 0.79 | 0.83 | 0.86 | 0.90 | 0.94 | 0.98 | 1.01 | 1.05 | 1.09 | 1.13 | 1.16 |
| 38 | 0.76 | 0.80 | 0.84 | 0.87 | 0.91 | 0.95 | 0.99 | 1.03 | 1.06 | 1.10 | 1.14 | 1.18 |
| 38.5 | 0.77 | 0.81 | 0.85 | 0.89 | 0.92 | 0.96 | 1.00 | 1.04 | 1.08 | 1.12 | 1.16 | 1.19 |
| 39 | 0.78 | 0.82 | 0.86 | 0.90 | 0.94 | 0.98 | 1.01 | 1.05 | 1.09 | 1.13 | 1.17 | 1.21 |
| 39.5 | 0.79 | 0.83 | 0.87 | 0.91 | 0.95 | 0.99 | 1.03 | 1.07 | 1.10 | 1.15 | 1.19 | 1.22 |
| 40 | 0.80 | 0.84 | 0.88 | 0.92 | 0.96 | 1.00 | 1.04 | 1.08 | 1.12 | 1.16 | 1.20 | 1.24 |
| 40.5 | 0.81 | 0.85 | 0.89 | 0.93 | 0.97 | 1.01 | 1.05 | 1.09 | 1.13 | 1.17 | 1.22 | 1.26 |
| 41 | 0.82 | 0.86 | 0.90 | 0.94 | 0.98 | 1.03 | 1.07 | 1.11 | 1.15 | 1.19 | 1.23 | 1.27 |
| 41.5 | 0.83 | 0.87 | 0.91 | 0.95 | 1.00 | 1.04 | 1.08 | 1.12 | 1.16 | 1.20 | 1.25 | 1.29 |
| 42 | 0.84 | 0.88 | 0.92 | 0.97 | 1.01 | 1.05 | 1.09 | 1.13 | 1.18 | 1.22 | 1.26 | 1.30 |
| 42.5 | 0.85 | 0.89 | 0.94 | 0.98 | 1.02 | 1.06 | 1.11 | 1.15 | 1.19 | 1.23 | 1.28 | 1.32 |
| 43 | 0.86 | 0.90 | 0.95 | 0.99 | 1.03 | 1.08 | 1.12 | 1.16 | 1.20 | 1.25 | 1.29 | 1.33 |
| 43.5 | 0.87 | 0.91 | 0.96 | 1.00 | 1.04 | 1.09 | 1.13 | 1.17 | 1.22 | 1.26 | 1.31 | 1.35 |
| 44 | 0.88 | 0.92 | 0.97 | 1.01 | 1.06 | 1.10 | 1.14 | 1.19 | 1.23 | 1.28 | 1.32 | 1.36 |
| 44.5 | 0.89 | 0.93 | 0.98 | 1.02 | 1.07 | 1.11 | 1.16 | 1.20 | 1.25 | 1.29 | 1.34 | 1.38 |
| 45 | 0.90 | 0.95 | 0.99 | 1.04 | 1.08 | 1.13 | 1.17 | 1.22 | 1.26 | 1.31 | 1.35 | 1.40 |
| 45.5 | 0.91 | 0.96 | 1.00 | 1.05 | 1.09 | 1.14 | 1.18 | 1.23 | 1.27 | 1.32 | 1.37 | 1.41 |
| 46 | 0.92 | 0.97 | 1.01 | 1.06 | 1.10 | 1.15 | 1.20 | 1.24 | 1.29 | 1.33 | 1.38 | 1.43 |
| 46.5 | 0.93 | 0.98 | 1.02 | 1.07 | 1.12 | 1.16 | 1.21 | 1.26 | 1.30 | 1.35 | 1.40 | 1.44 |
| 47 | 0.94 | 0.99 | 1.03 | 1.08 | 1.13 | 1.18 | 1.22 | 1.27 | 1.32 | 1.36 | 1.41 | 1.46 |
| 47.5 | 0.95 | 1.00 | 1.05 | 1.09 | 1.14 | 1.19 | 1.24 | 1.28 | 1.33 | 1.38 | 1.43 | 1.47 |
| 48 | 0.96 | 1.01 | 1.06 | 1.10 | 1.15 | 1.20 | 1.25 | 1.30 | 1.34 | 1.39 | 1.44 | 1.49 |
| 48.5 | 0.97 | 1.02 | 1.07 | 1.12 | 1.16 | 1.21 | 1.26 | 1.31 | 1.35 | 1.41 | 1.46 | 1.50 |
| 49 | 0.98 | 1.03 | 1.08 | 1.13 | 1.18 | 1.23 | 1.27 | 1.32 | 1.37 | 1.42 | 1.47 | 1.52 |
| 49.5 | 0.99 | 1.04 | 1.09 | 1.14 | 1.19 | 1.24 | 1.29 | 1.34 | 1.39 | 1.44 | 1.49 | 1.53 |
| 50 | 1.00 | 1.05 | 1.10 | 1.15 | 1.20 | 1.25 | 1.30 | 1.35 | 1.40 | 1.45 | 1.50 | 1.55 |

| | | T (° C.) | | | | | | | | | |
|---|---|---|---|---|---|---|---|---|---|---|---|
| | | 84 | 85 | 86 | 88 | 90 | 92 | 94 | 96 | 98 | 100 |
| solids (% w) | 35 | 1.12 | 1.14 | 1.16 | 1.19 | 1.23 | 1.23 | 1.23 | 1.23 | 1.23 | 1.23 |
| | 35.5 | 1.14 | 1.15 | 1.17 | 1.21 | 1.24 | 1.24 | 1.24 | 1.24 | 1.24 | 1.24 |
| | 36 | 1.15 | 1.17 | 1.19 | 1.22 | 1.26 | 1.26 | 1.26 | 1.26 | 1.26 | 1.26 |
| | 36.5 | 1.17 | 1.19 | 1.20 | 1.24 | 1.28 | 1.28 | 1.28 | 1.28 | 1.28 | 1.28 |
| | 37 | 1.18 | 1.20 | 1.22 | 1.26 | 1.30 | 1.30 | 1.30 | 1.30 | 1.30 | 1.30 |
| | 37.5 | 1.20 | 1.22 | 1.24 | 1.28 | 1.31 | 1.31 | 1.31 | 1.31 | 1.31 | 1.31 |
| | 38 | 1.22 | 1.24 | 1.25 | 1.29 | 1.33 | 1.33 | 1.33 | 1.33 | 1.33 | 1.33 |
| | 38.5 | 1.23 | 1.25 | 1.27 | 1.31 | 1.35 | 1.35 | 1.35 | 1.35 | 1.35 | 1.35 |
| | 39 | 1.25 | 1.27 | 1.29 | 1.33 | 1.37 | 1.37 | 1.37 | 1.37 | 1.37 | 1.37 |
| | 39.5 | 1.26 | 1.28 | 1.30 | 1.34 | 1.38 | 1.38 | 1.38 | 1.38 | 1.38 | 1.38 |
| | 40 | 1.28 | 1.29 | 1.32 | 1.36 | 1.40 | 1.40 | 1.40 | 1.40 | 1.40 | 1.40 |
| | 40.5 | 1.30 | 1.32 | 1.34 | 1.38 | 1.42 | 1.42 | 1.42 | 1.42 | 1.42 | 1.42 |
| | 41 | 1.31 | 1.33 | 1.35 | 1.39 | 1.44 | 1.44 | 1.44 | 1.44 | 1.44 | 1.44 |
| | 41.5 | 1.33 | 1.35 | 1.37 | 1.41 | 1.45 | 1.45 | 1.45 | 1.45 | 1.45 | 1.45 |
| | 42 | 1.34 | 1.37 | 1.39 | 1.43 | 1.47 | 1.47 | 1.47 | 1.47 | 1.47 | 1.47 |
| | 42.5 | 1.36 | 1.38 | 1.40 | 1.45 | 1.49 | 1.49 | 1.49 | 1.49 | 1.49 | 1.49 |
| | 43 | 1.38 | 1.40 | 1.42 | 1.46 | 1.51 | 1.51 | 1.51 | 1.51 | 1.51 | 1.51 |
| | 43.5 | 1.39 | 1.41 | 1.44 | 1.48 | 1.52 | 1.52 | 1.52 | 1.52 | 1.52 | 1.52 |
| | 44 | 1.41 | 1.43 | 1.45 | 1.50 | 1.54 | 1.54 | 1.54 | 1.54 | 1.54 | 1.54 |
| | 44.5 | 1.42 | 1.45 | 1.47 | 1.51 | 1.56 | 1.56 | 1.56 | 1.56 | 1.56 | 1.55 |
| | 45 | 1.44 | 1.48 | 1.48 | 1.53 | 1.58 | 1.58 | 1.58 | 1.58 | 1.58 | 1.58 |
| | 45.5 | 1.46 | 1.48 | 1.50 | 1.55 | 1.59 | 1.59 | 1.59 | 1.59 | 1.59 | 1.59 |
| | 46 | 1.47 | 1.50 | 1.52 | 1.56 | 1.61 | 1.61 | 1.61 | 1.61 | 1.61 | 1.61 |
| | 46.5 | 1.48 | 1.51 | 1.53 | 1.58 | 1.63 | 1.63 | 1.63 | 1.63 | 1.63 | 1.63 |
| | 47 | 1.50 | 1.53 | 1.55 | 1.60 | 1.65 | 1.65 | 1.65 | 1.65 | 1.65 | 1.65 |
| | 47.5 | 1.52 | 1.54 | 1.57 | 1.62 | 1.66 | 1.66 | 1.66 | 1.66 | 1.66 | 1.66 |
| | 48 | 1.54 | 1.56 | 1.58 | 1.63 | 1.68 | 1.68 | 1.68 | 1.68 | 1.68 | 1.68 |
| | 48.5 | 1.55 | 1.58 | 1.60 | 1.65 | 1.70 | 1.70 | 1.70 | 1.70 | 1.70 | 1.70 |
| | 49 | 1.57 | 1.59 | 1.62 | 1.67 | 1.72 | 1.71 | 1.72 | 1.72 | 1.72 | 1.72 |
| | 49.5 | 1.58 | 1.61 | 1.63 | 1.68 | 1.73 | 1.73 | 1.73 | 1.73 | 1.73 | 1.73 |
| | 50 | 1.60 | 1.63 | 1.65 | 1.70 | 1.75 | 1.75 | 1.75 | 1.75 | 1.75 | 1.75 |

Figure 3B:
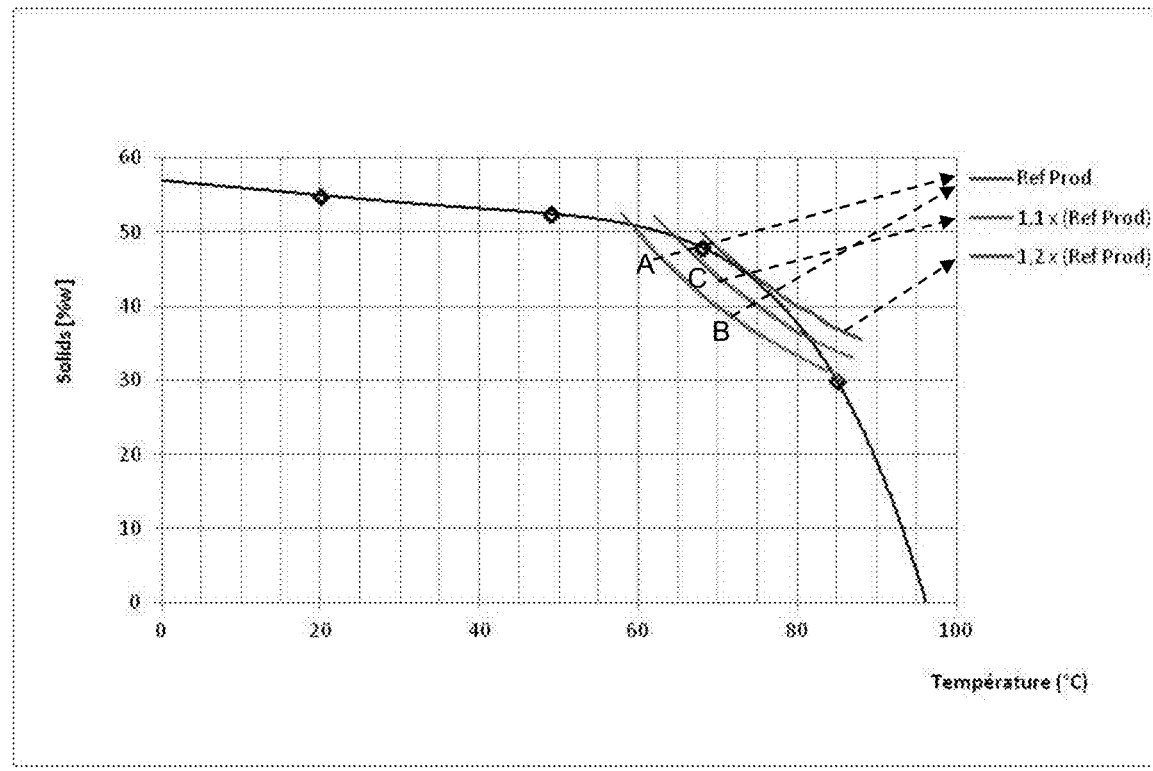
FIG. 3B represents a graph plotting catalyst productivity profiles to a temperature/solid diagram.

With the help of such a table, it is possible to add the productivity profiles to a temperature/solid diagram. This is illustrated in FIG. 3B.

Imagine an initial operating point "A". From the curve it can be seen that the same catalytic performance can be obtained throughout the reference curve. Therefore moving operating point A to point B will result in the same catalytic performance while moving away from the unstable zone.

Moreover, moving operating point to point C will result in increased catalytic efficiency (10% above reference productivity) while retaining overall same safety margins than point A.

It can also be deduced from this chart that trying to achieve 20% higher catalytic efficiency for this product and recipe is impossible without going into the unstable zone.

In some embodiments, the process comprises the steps of:
e) analyzing catalyst yield as a function of concentration and temperature; and
f) selecting operating conditions from said set of one or more operating conditions obtained in step d1) or d2) for the synthesis of the polyolefin in the olefin polymerization reactor to maximize catalyst yield, based on the analysis performed in step e).

In a fourth aspect, a process for the synthesis of a polyolefin in a olefin polymerization reactor is also encompassed herein, said process comprising the steps of: determining the operating conditions of the olefin polymerization reactor according to the process of the first or the second aspect of the present invention; feeding a diluent and at least one olefin-containing hydrocarbon feedstock into said polymerization reactor; and converting at least part of the olefins contained in said hydrocarbon feedstock, in the presence of at least one catalyst, into said polyolefin, and recovering the polyolefin product. Preferred embodiments for the first or second aspect of the invention are also preferred embodiments for the fourth aspect of the invention.

The present inventors have found that in order to prevent issues for a given product quality, it was beneficiary to carefully control both temperature and solids content in the polymerization reactors. They found that it was the interaction between both parameters that gave the stability or instability in the reactors. They have found that the maximum solid content a reactor can withstand was linked to the reactor operating temperature. Both temperatures and solids are preferably taken into account for describing a safe operating region for polymerization reactors for a given product quality. They have found that the link between maximum solid content and temperature was a highly non-linear curve.

The present process allows establishing, for each grade recipe created, the maximum curve in concentration/temperature space. This will establish the limit curve below which operations are recommended. Determination of the curve allowed, for a given product quality (reactor recipe: such as catalyst type, solvent type, monomer content in reactor and co-monomer content in reactor) to gives the safe operating region (region below curve). The reactor being monitored can therefore be operated in the safe side thus increasing unit reliability and stream time. It can also be operated at the limit of the curve therefore optimizing catalyst productivity while remaining problem free.

The inventors have shown that when a reactor is operated above the curve, flow pattern disturbances may appear, fouling generation begins and even hydrodynamic instability can be formed (solid gel). With the present process and the determination of the set of conditions (plotting curve), the operator can advantageously see that the reactor is being operated in an unstable region and take actions to prevent future issues. Some of these actions can preferably be but are not limited to decreasing temperature and/or decreasing solid contents in order to move to an operating point below the curve.

The advantages of the present invention are illustrated by the following examples.

EXAMPLES

Example 1

This example illustrates a process for determining a set of one or more stable operating conditions for polymerizing a given resin according to an embodiment of the present invention.

The process was performed using a metallocene catalyzed resin in heptane in a glass vessel (1) where pump power consumption was monitored as a function of temperature and solid content. A jacketed glass batch vessel (1), with a volume of 2000 ml was used. The vessel (1) is illustrated in FIGS. 1A and 1B. The vessel was provided with a powered (M) agitator, and oil bath (4) operably connected to a temperature regulator (5) was used as a thermostat. The vessel (1) comprised an inlet (2) for the reactant, and a reflux (3).

The diluent used was n-heptane. The amount of the diluent was 557 g. The polyolefin used was Lumicene® mPE M 2310 EP, commercially available from Total Refining & Chemicals. Lumicene® mPE M 2310 EP is a second generation metallocene based linear low density polyethylene with 1-hexene as co-monomer. The density, as measured according to ISO 1183 at 23° C. was 0.923 g/cm³. The melt flow rate $MI_2$, as measured according to ISO 1133 at a temperature of 190° C. under a load of 2.16 kg, was 0.9 g/10 min. The melting temperature, according to ISO 11357, was 116° C.

Lumicene® mPE M 2310 EP fluff, obtained from the reactors, was gradually introduced into the vessel containing heptane. The temperature of the vessel was controlled by the oil bath (4) connected to a temperature regulator (5).

For a given temperature, the concentration of the polyolefin was increased step by step while the formed slurry was agitated continuously by electrically powered motor agitator. The given temperatures used in the example 1 were 20° C., 48° C., 68° C. and 85° C. The polyolefin concentration started from 0% by weight, and the concentration was gradually increased to 10%, 20%, 30%, 35%, 40%, 45%, 50%, 55%, and 57.5% by weight, based on the total weight of the slurry. The power consumption of the agitator was recorded in Watt. The power consumption of the agitator was plotted as a function of the polyolefin concentration for each temperature. This is illustrated in FIG. 2. From this graph the maximum stable concentration can be seen for each given temperature: 55% at 20° C., 52.5% at 49° C., between 45% and 50% at 68° C. (averaged out to 47.5%) and 30% at 85° C.

In the next step, the maximum solid concentration was plotted a function of the temperature. This data was fitted into a curve as illustrated in FIG. 3A.

From the curve, the optimal operating conditions were determined for Lumicene® mPE M 2310 EP. The optimal operating conditions are under the curve of FIG. 3A. Using this process and the optimal operating conditions determined therewith, Lumicene® mPE M 2310 EP could then be produced in a polymerization process having increased reliability and stream time. Catalyst productivity during the polymerization was optimized, while remaining problem free.

Example 2

This example illustrates what happens when the reaction conditions move from a situation below the curve to a situation above the curve.

The Lumicene® mPE M 2310 EP as described in example 1 was used in this experiment. The polyolefin was gradually introduced into the vessel containing heptane. Pump power consumption was monitored as a function of temperature (Slurry T, in ° C.) and solid content or concentration (mass fluff (m), in g and in wt %, based on the total weight of the content of the vessel (slurry)). Results are shown in Table 1.

TABLE 1

| m fluff (g) | m fluff (wt %) | Slurry T (° C.) | Normalized Power | Observations |
|---|---|---|---|---|
| 0.0 | 0 | 85 | 1.00 | stable |
| 62.0 | 10 | 85 | 0.99 | stable |

TABLE 1-continued

| m fluff (g) | m fluff (wt %) | Slurry T (° C.) | Normalized Power | Observations |
|---|---|---|---|---|
| 139.2 | 20 | 85 | 0.99 | stable |
| 179.2 | 24 | 85 | 0.99 | stable |
| 199.2 | 26 | 85 | 0.99 | stable |
| 219.2 | 28 | 85 | 0.99 | stable |
| 239.2 | 30 | 85 | 0.99 | stable, flow pattern disturbed, waves have a smaller amplitude |
| 259.2 | 32 | 85 | 1.00 | stable, but flow pattern disturbed, no waves, creation of velocity gradient (no flow near wall) |
| 279.2 | 33 | 85 | 1.41 | creation of a solid gel (jellyfish or hydrodynamic instability) |

Using the method as described above, wherein from the discrete set of m experimental points $(x_i; y_i)$ with x being the abscissa and y being the ordinate, $i \in [1;m]$ and m being the number of total experimental points, the value defined as $$a_i = \frac{y_{i+1} - y_i}{x_{i+1} - x_i}$$

is computed for each $i \in [1;m]$, we see that a6=(0.99−0.99)/(30−28)=0, a7=(1.00−0.99)/(32−30)=0.005, and a8=(1.41−1.00)/(33−32)=0.41. 0.005>1.1*0, so the critical point would be at 32 wt %.

By progressively adding solids to the vessel while remaining at a constant temperature, the experiment follows a vertical line in the solids vs. temperature diagram, as schematically illustrated in FIG. 3. Even though initially the temperature of 85° C. was at the "safe side" for low solids concentrations, solids concentration above 30 wt % was reached where the flow pattern was disturbed leading to a no flow zone near the walls. It is to be noted that at this point, even though fouling might occur in the long term, operations may still be possible: the vessel was stirred and power consumption did not increase significantly. However, this no flow zone will probably lead to long term fouling of the vessel. By increasing the concentration even further to 33 wt %, a solid gel was formed, pump power consumption increased significantly, and circulation in the vessel stopped due to the formation of a hydrodynamic instability or solid gel.

Figure 4:
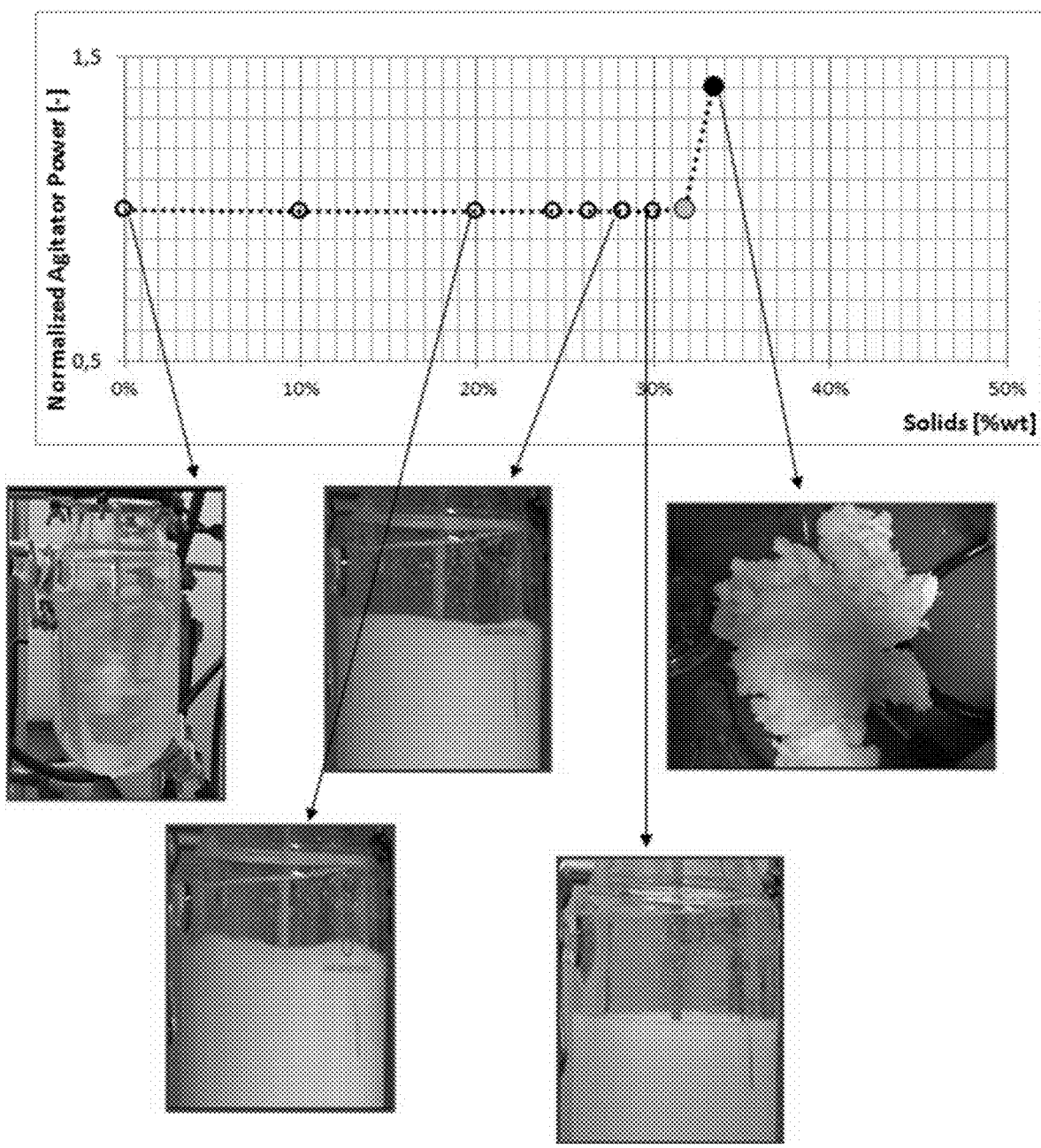
FIG. 4 represents a graph plotting the power consumption of the agitator as a function of the concentration for a fixed temperature, and pictures of the container for selected points.

In this way, a maximum solid content of 32 wt % could be obtained for the set temperature of 85° C. These measurement points were also plotted in FIG. 4, with the addition of photographs of the mixture for some key measurement points.

The invention claimed is:

1. A process for determining a set of one or more operating conditions of an olefin polymerization reactor for the synthesis of a polyolefin in slurry condition, comprising the steps of:
   a) introducing a polyolefin into a volume of at least one diluent, wherein:
      a1) the diluent is agitated by a powered agitator at a first temperature T1, or
      a2) the diluent is agitated by a powered agitator, at a first polyolefin concentration C1;
   b) monitoring the power consumed by the agitator as a function of either:
      b1) polyolefin concentration, for at least three concentrations C1, C2, and Cn, which are different from each other, or
      b2) temperature, for at least three temperatures T1, T2, and Tn, which are different from each other
   c) repeating:
      c1) steps a1) and b1) at two or more subsequent temperatures T2 and Tn, which are different from each other and from T1, or
      c2) steps a2) and b2) at two or more subsequent polyolefin concentrations C2 and Cn, which are different from each other and from C1; and
   d) determining from the power consumed by the agitator as a function of either:
      d1) concentration, the set of one or more stable operating conditions for the synthesis of the polyolefin in the olefin polymerization reactor, or
      d2) temperature, the set of one or more operating conditions for the synthesis of the polyolefin in the olefin polymerization reactor.

2. The process according to claim 1, wherein the polyolefin is a metallocene-catalyzed polyolefin.

3. The process according to claim 1, wherein the polyolefin is a metallocene-catalyzed polyethylene.

4. The process according to claim 1, wherein step a1) or a2) is performed in a container (1) which is not the main olefin polymerization reactor.

5. The process according to claim 4, wherein the temperature of the container (1) is thermostatically controlled.

6. The process according to claim 1, wherein the data obtained in step b1) or b2) are visualized as a graph plotting the power consumption as a function of the concentration at a given temperature or as a graph plotting the power consumption as a function of the temperature at a given concentration.

7. The process according to claim 1, wherein the data obtained in step c1) or c2) are visualized as a graph plotting the concentration at which the power consumption of the agitator reaches a critical point as a function of the temperature or as a graph plotting the temperature at which the power consumption of the agitator reaches a critical point as a function of the concentration.

8. The process according to claim 1, further comprising the step of fitting a curve to the data of step c1) or c2) in a graph plotting temperature versus concentration or concentration versus temperature, wherein the set of one or more operating conditions are preferably in the area under the curve.

9. The process according to claim 1, further comprising the step of fitting a curve to the critical points obtained from the data of step c1) or c2) in a graph plotting temperature versus concentration or concentration versus temperature, wherein the set of one or more operating conditions are preferably in the area under the curve.

10. The process according to claim 1, wherein the olefin polymerization reactor comprises at least one loop reactor.

11. The process according to claim 1, further comprising the steps of:
   e) analyzing catalyst yield as a function of concentration and temperature; and
   f) selecting operating conditions from the set of one or more operating conditions obtained in step d1) or d2) for the synthesis of the polyolefin in the olefin polymerization reactor to maximize catalyst yield, based on the analysis performed in step e).

12. A process for operating an olefin polymerization reactor in slurry condition, comprising the steps of:

i) receiving a set of one or more operating conditions of an olefin polymerization reactor previously obtained according to the process of claim 1, and ii) operating the olefin polymerization reactor at operating conditions within the set of one or more operating conditions obtained in step i).

13. The process according to claim 12, wherein step ii) comprises the steps of:

ii') obtaining the actual operating conditions of the olefin polymerization reactor;

ii") comparing the actual operating conditions of the olefin polymerization reactor to the set of one or more operating conditions of an olefin polymerization received in step i);

ii'") if necessary, adapting the operating conditions such that the actual operating conditions fall within the set of one or more operating conditions received in step i).

14. The process according to claim 12 further comprising the step of using one or more by-pass lines for performing step ii).

\* \* \* \* \*